Aug. 28, 1923.
C. W. SHOCKLEY
SELECTOR FOR GEAR SHIFTING MECHANISM
Filed Aug. 26, 1920  4 Sheets-Sheet 2
1,466,067
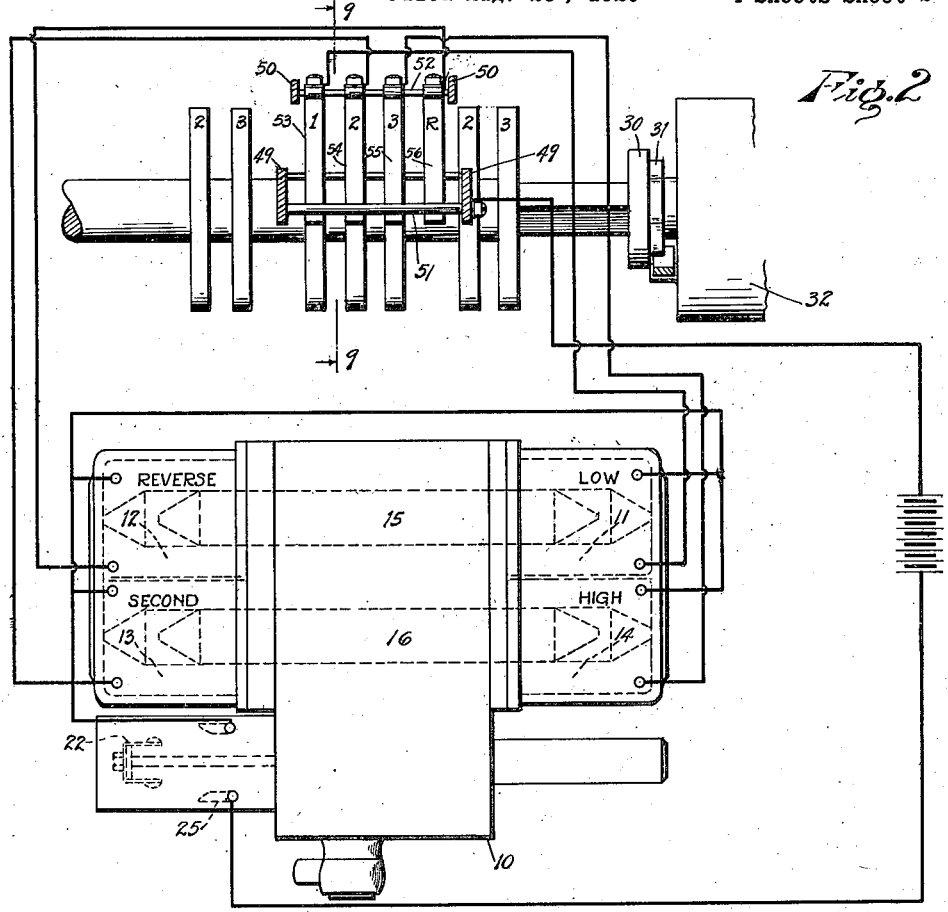
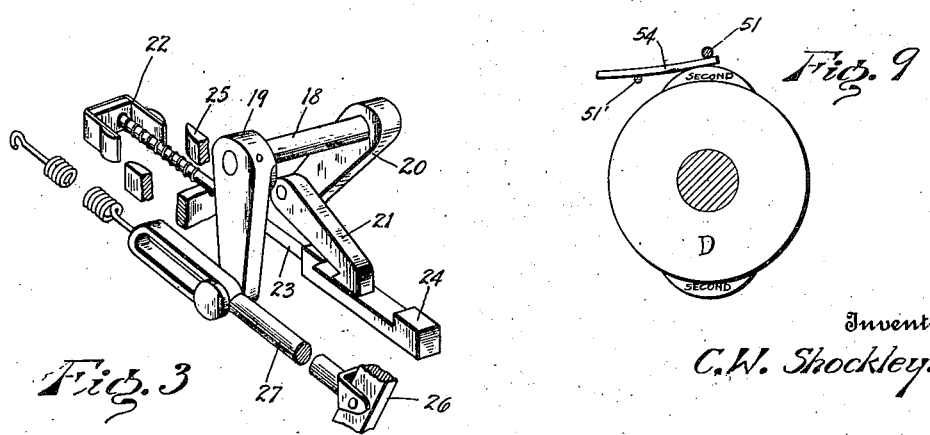

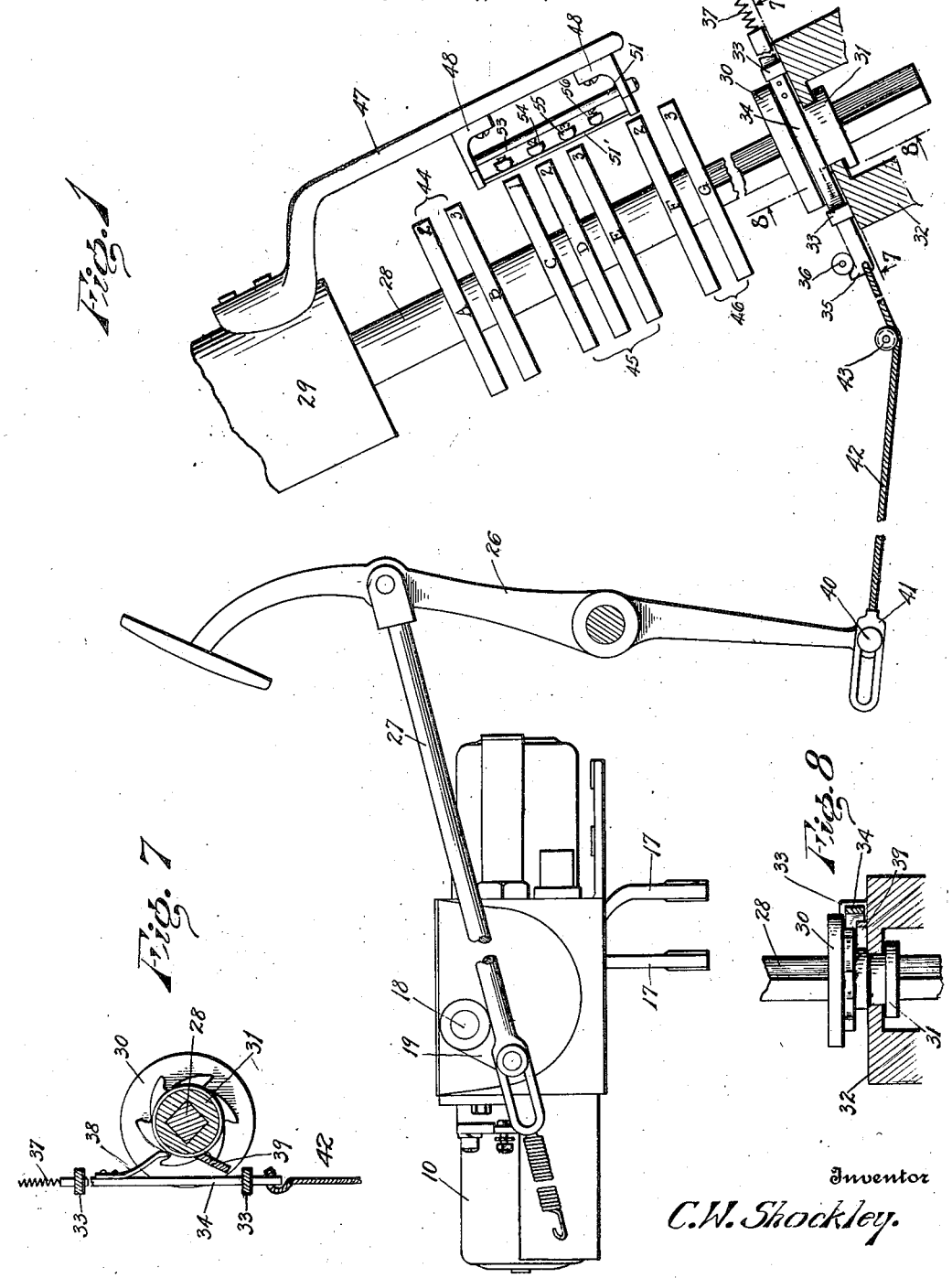

Aug. 28, 1923.  
C. W. SHOCKLEY  
SELECTOR FOR GEAR SHIFTING MECHANISM  
Filed Aug. 26, 1920  
1,466,067  
4 Sheets-Sheet 3
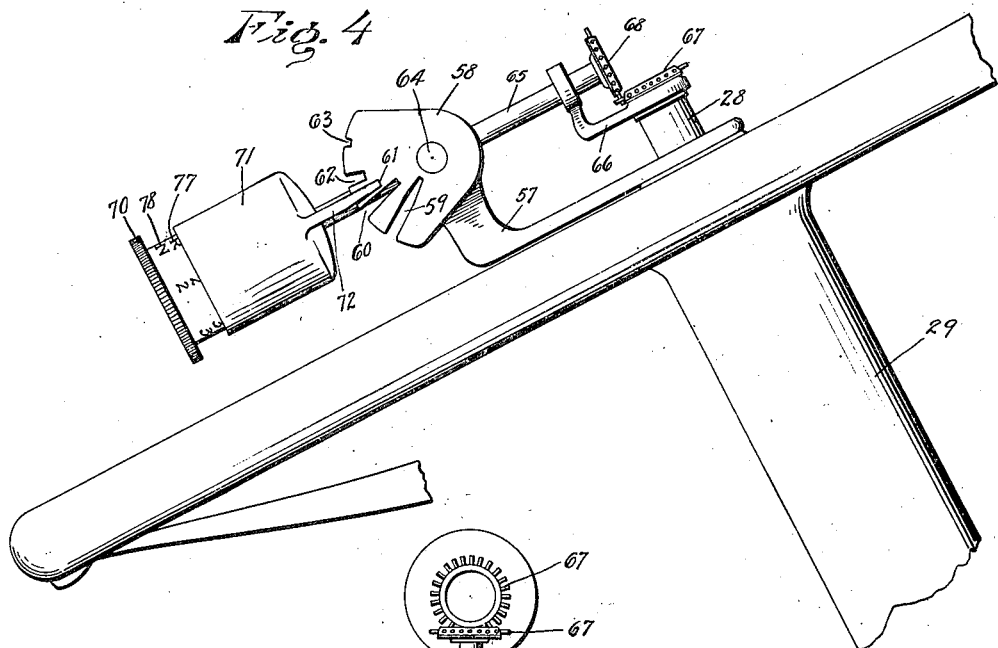
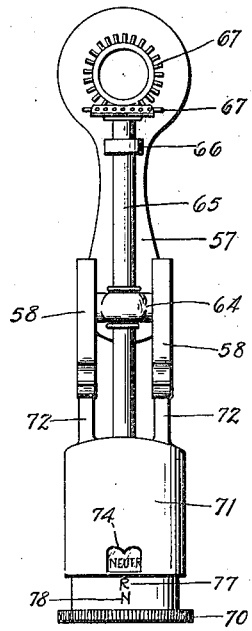
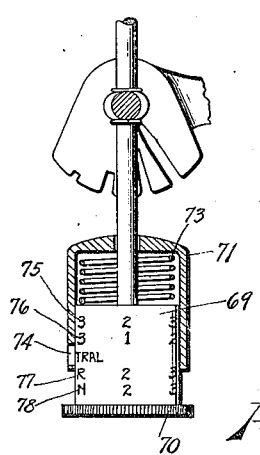
Inventor  
C. W. Shockley.  
By  
Lacey & Lacey, Attorneys

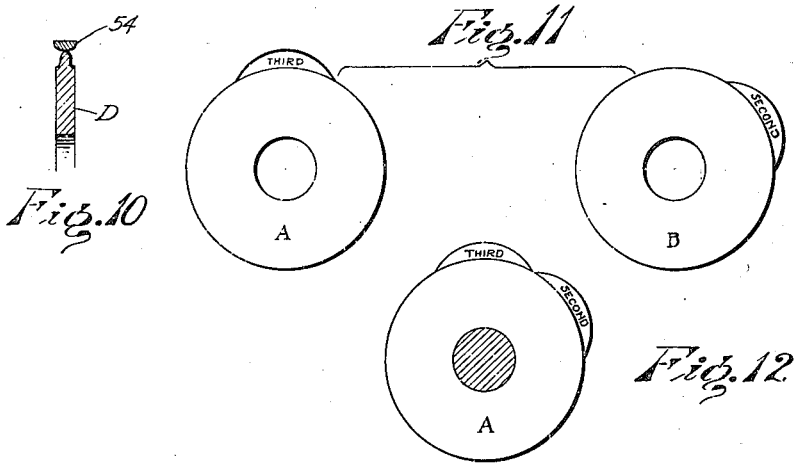
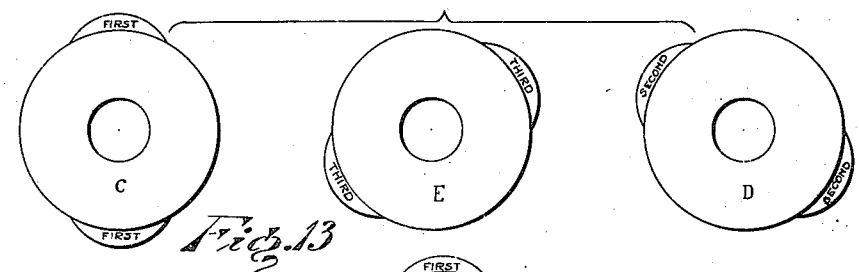
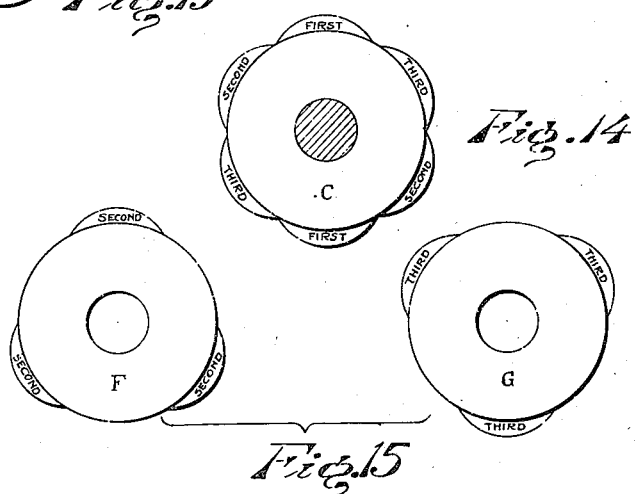

Patented Aug. 28, 1923.

1,466,067

UNITED STATES PATENT OFFICE.

CLARENCE W. SHOCKLEY, OF MOUNT STERLING, OHIO.

SELECTOR FOR GEAR-SHIFTING MECHANISM.

Application filed August 26, 1920. Serial No. 406,061.

*To all whom it may concern:*

Be it known that I, CLARENCE W. SHOCKLEY, a citizen of the United States, residing at Mount Sterling, in the county of Madison and State of Ohio, have invented certain new and useful Improvements in Selectors for Gear-Shifting Mechanism, of which the following is a specification.

This invention relates to an improved commutation selector for gear shifting mechanism, being particularly designed for use in conjunction with gear shifting mechanism of the general type disclosed in Patent No. 1,258,921, issued March 12th, 1918, to W. A. McCarrell.

The invention has as one of its principal objects to provide a mechanism which will eliminate the necessity for manually closing a selector switch each time a change in speed gears is desired.

A further object of the invention is to provide a mechanism which will eliminate confusion in effecting shifting of the speed gears.

Another important object of the invention is to provide a mechanism which may be set to effect the successive shifting of the gears of a definite cycle and then continue repeating the cycle.

A still further object of the invention is to provide a mechanism wherein different gear cycles may be selected to suit different road and traffic conditions.

A further object of the invention is to provide a mechanism which may be set to effect the successive shifting of the gears of a cycle but wherein the cycle will not be repeated.

The invention has as a further object to provide a mechanism which may be set to effect the shifting of any individual gear desired.

And a still further object of the invention is to provide a mechanism employing an indicator which, for all of the speed gears, will identify the coming gear to be shifted.

Other and incidental objects will appear hereinafter.

In the accompanying drawings:

Figure 1 is a fragmentary side elevation showing my improved selector in connection with gear shifting mechanism as disclosed in the patent previously identified herein, Figure 2 is a fragmentary plan view diagrammatically showing the wiring between the selector and the gear shifting mechanism, Figure 3 is a detail perspective showing the master switch of the gear shifting mechanism, Figure 4 is a fragmentary side elevation of the indicator employed, Figure 5 is a detail plan view of the indicator, Figure 6 is a fragmentary section taken vertically through the indicator, Figure 7 is a section on the line 7—7 of Figure 1, looking in the direction of the arrows, this view showing the ratchet of the selector and illustrating the pawl engaged with the ratchet, Figure 8 is a section on the line 8—8 of Figure 1, looking in the direction of the arrows, Figure 9 is a section on the line 9—9 of Figure 2, looking in the direction of the arrows, Figure 10 is a detail section taken through one of the cams employed and a switch contact showing how the cam may be moved transversely beneath the contact, Figure 11 is an elevation individually showing the cams of one of the sets employed, Figure 12 is an elevation showing said cams assembled, Figure 13 is an elevation individually showing the cams of another set employed, Figure 14 is an elevation showing the cams of the set illustrated in Figure 13, assembled, Figure 15 is an elevation individually showing the cams of still another set employed, and Figure 16 is an elevation showing the cams illustrated in Figure 15, assembled.

As previously intimated, my improved selector is particularly designed for use in connection with gear shifting mechanism of the general type disclosed in the patent previously referred to and in the drawings, I have accordingly shown portions of said mechanism as illustrated in said patent in order to clearly bring out the function and operation of the present invention. Briefly stated, said mechanism includes a casing 10 in which are mounted a plurality of electro-responsive devices comprising solenoid windings 11, 12, 13 and 14, respectively. Sliding elements 15 and 16 provide the cores of the solenoids and extending from these elements are suitable shifters 17 operatively connected with the movable elements of the transmission gearing to be controlled. In this connection it may be explained that movement of the element 15 by the energization of the winding 11 will result in rendering the low speed active while movement of said core by the winding 12 will result in rendering the reverse speed gear active. Similarly, attraction of the core 16 by the winding 13 will result in rendering the second speed gear active, while attraction of said core by the winding 14 will result in rendering the high speed gear active. Extending from the casing is a rock shaft 18 to the outer end of which is connected an arm 19 while to the inner end of said shaft is fixed a second arm 20 carrying a pawl 21. As will be perceived, the cores 15 and 16 and the solenoid windings therefor are employed to effect movement of the gears to mesh and a normally open master switch 22 is provided to complete the circuit to any one of the windings selected. This switch has a reciprocable operating rod 23 provided with a notched extremity 24 affording shoulders to be engaged by the pawl 21. Thus, as will be seen, when the arm 19 is rocked forwardly, the pawl will operate to shift the switch 22 to closed position completing a circuit across suitable stationary contacts 25. The mechanism is employed in conjunction with a foot operated transmission clutch in an arrangement whereby the speed change gears are manually moved out of mesh by the operating lever of the clutch and thereafter moved to the desired meshing combination by one of the solenoids. A clutch lever is conventionally illustrated at 26. Extending between said lever and the arm 19 is a link 27 having a lost motion connection with said arm. Thus, the pedal may be moved to middle position for releasing or throwing out the clutch while, when the forward movement of the pedal is continued, the arm 19 will be rocked for closing the master switch. In this connection, it should be explained that the mechanism is such that when the arm 19 is thus rocked, the speed gears will be moved to neutral position before the switch is closed so that the shifting of a selected gear will not occur while any other gear is active. However, since these details do not concern the present invention they have not been shown. The present invention seeks to provide a selector for predetermining the circuit connections of the several solenoid windings so that when the clutch pedal 26 is operated and the master switch 22 closed the gear selected will be shifted.

In carrying the invention into effect, I employ a cam shaft 28. This cam shaft is preferably journaled through the steering post of the vehicle to which the mechanism is applied and, accordingly, in the drawings, I have conventionally shown a steering post at 29. As particularly shown in Figure 1, the shaft is formed with a squared lower end portion and fitting said end portion of the shaft is a ratchet 30 from which extends a flanged sleeve 31. This sleeve is journaled in a bearing 32 with which the flange of the sleeve coacts for holding the ratchet against axial movement so that, as will be seen, the ratchet will rotatably support the shaft at its lower end while, at the same time, the shaft may be moved endwise through the ratchet. Projecting from the bearing at one side of the ratchet are spaced guides 33 and slidable vertically through these guides is a bar 34 provided at its lower end with a stop lug 35. Suitably mounted at the rear edge of the bar is a roller 36 with which the bar coacts and connected to the upper end of the bar is a spring 37 normally holding the bar retracted having its lug 35 engaging the roller 36, limiting the bar in its upward movement. Fixed at one end to the bar is, as particularly shown in Figure 7, a spring pawl 38 extending laterally from the bar to cooperate at its opposite end with the teeth of the ratchet. In this connection it is to be observed that the ratchet is formed with six teeth spaced substantially sixty degrees apart so that each time the bar is pulled downwardly, the pawl will cooperate with one of said teeth for rotating the shaft 28 substantially sixty degrees. Upon the release of the bar, the spring 37 will, of course, return the bar to its original position, when the pawl will be disposed to engage the next succeeding tooth of the ratchet. Projecting from the bearing 32 in front of the bar 34 is, as particularly shown in Figures 7 and 8, an inclined cam lug 39. As will be observed, the pawl is of a width to overhang this lug and the lug is so arranged that when the ratchet has been turned sixty degrees, the pawl will ride against the lug out of engagement with the tooth with which it is in contact. Consequently, the lug will, when the bar 34 is actuated, prevent the pawl from turning the shaft more than the sixty degrees desired. Projecting from the lower end of the clutch pedal 26 is a pin 40 upon which is slidably mounted a yoke 41 and extending between said yoke and the lower end of the bar 34 is a flexible element 42 which, beneath the lower end of the bar, is preferably trained around a suitable pulley 43. Thus, as will be perceived, the yoke 41 provides a lost motion connection between the pedal and the flexible element so that the pedal may be moved to a middle position for releasing or throwing out the clutch while, when the forward movement of the pedal is continued, the bar 34 will be drawn downwardly and the shaft 28 rotated.

Fixed to the shaft 28 is a set 44 of spaced companion cams. Two cams are comprised in this set and, for convenience, said cams have been lettered A and B respectively. As shown in detail in Figures 11 and 12, each of said cams is formed at its periphery with a cam lug and the cams are assembled upon the shaft in such manner that these lugs are staggered sixty degrees apart. Fixed to the shaft 28 below the set of cams 44 is a second set 45 of spaced companion cams. This set comprises three cams and, for convenience, the cams of said set have been lettered C, D and E respectively. As shown in detail in Figures 13 and 14, the cams C, D and E are each formed with diametric cam lugs and the cams are so arranged upon the shaft that said lugs are spaced sixty degrees apart. Fixed upon the shaft 28 below the set of cams 45 is a third set 46 of spaced companion cams. Two cams are comprised in this set and, for convenience, said cams have been lettered F and G respectively. As shown in detail in Figures 15 and 16 of the drawings, the cams F and G are each formed with three equally spaced cam lugs and the cams are so arranged upon the shaft that said lugs are spaced sixty degrees apart. All the cams may be of insulating material or may be suitably insulated from the shaft 28. Fixed at one end to the lower end portion of the outer stationary shell of the steering post 29 is, as particularly shown in Figure 1, an arm 47 extending over the sets of cams, and depending from said arm are brackets 48. These brackets are, as best shown in Figure 2, provided with a pair of oppositely disposed lugs 49 and a second pair of oppositely disposed lugs 50 spaced laterally from the first pair of lugs. Extending between the pair of lugs 49 is an energized contact bar 51 suitably insulated from said lugs and below said rod is arranged a rest rod 51' normally supporting the contacts at their free end portions and also insulated from the lugs. Extending between the pair of lugs 50 is a pivot rod 52. Spaced contacts 53, 54, 55 and 56 are pivoted upon said rod but are suitably insulated therefrom. In Figure 2, I have diagrammatically shown the manner in which the contacts are included in circuit with the electro-responsive devices of the gear shifting mechanism. A detailed description in this regard is believed unnecessary. However, it may be observed that the master switch 22, controls the closing of circuit to all of the solenoid windings 11, 12, 13 and 14 while the bar 51 is energized through a wire leading directly from the source of electrical energy. Further, it is to be noted that the contact 53 controls the circuit to the winding 11 while the contact 54 controls the circuit to the winding 13. Similarly, the contact 55 controls the circuit to the winding 14 while the contact 56 controls the circuit to the winding 12. Thus, as will be understood in view of the preceding description, when the contact 53 is shifted to engage the bar 51 and the clutch pedal 26 is moved forwardly, as previously explained, for closing the master switch, the low speed gear will be shifted, while when the contact 54 is moved to engage said bar, the second speed gear will be shifted. Upon movement of the contact 55 to engage the bar, the high speed gear will, under similar conditions, be shifted while, when the contact 56 is moved to engage the bar, the reverse speed gear will be shifted.

Fixed to one of the inner stationary tubes of the steering post 29, at the upper end of said post, is a bracket 57 upstanding at its outer end from the steering wheel and formed with spaced segments 58. In the rear edges of these segments are provided pairs of oppositely disposed notches 59, 60, 61, 62 and 63. From the notches 59, which are the deepest, the notches of the several pairs gradually decrease in depth to the pair of notches 63, which are the most shallow. Extending between and journaled at its ends through the segments 58, is a yoke 64 and extending freely through this yoke is a combined setting and indicator shaft 65. At its forward end portion this shaft is coupled with the shaft 28 by an angle bracket 66 journaling both of said shafts. However, the shaft 65 is loosely received through said bracket so that the angularity between the two shafts may vary. Upon the upper end of the shaft 28 is fixed a pin gear 67 and coacting with this gear is a similar pin gear 68 fixed upon the forward end of the shaft 65. Mounted upon the rear end of the shaft 65 is a cylindrical indicator 69 provided at its outer end with a knurled flange 70 and freely surrounding said indicator is a cover sleeve 71 freely receiving the shaft through the inner end wall thereof. Projecting from the inner end wall of said sleeve are spaced lugs or arms 72 selectively engageable in the pairs of notches of the segments 58 and bearing between said end wall and the inner end of the indicator is a spring 73 urging the sleeve in a direction to uncover the indicator and at the same time maintain the lugs 72 coacting with the segments.

As will now be readily understood, the shaft 65 may be rocked downwardly at its inner end for elevating the shaft 28 when the lugs 72 of the sleeve 71 may be engaged in the notches 59 for locking the shaft set. The cams F and G of the set 46 will then be disposed beneath the contacts 54 and 55. Consequently, as the forward movement of the clutch pedal 26 is repeated and the shaft 28 is rotated, as previously described, the lugs of said cams will cooperate with said contacts for closing first one and then the other against the bar 51. Thus, assuming the second speed gear to be active, the high speed gear will, when the clutch pedal is shifted, be automatically selected so that the movement of the pedal will serve to effect shifting of the high speed gear while, when the high speed gear is active, and the clutch pedal is shifted, the second speed gear will be automatically selected. This selection of the second and high speed gears will, of course, be repeated as long as the shaft 65 remains set in the position indicated, so that after initial setting of said shaft, change may be made from one speed to the other simply by shifting the clutch pedal. In this connection it is to be observed, as shown in Figure 10, that the contacts 53, 54, 55 and 56 are formed with convex lower faces so that should said contacts be disposed in the path of any one or more of the cam lugs of the several sets of cams when the shaft 28 is moved endwise, such cam or cams will ride beneath the contacts. By swinging the rear end of the shaft 65 upwardly and engaging the lugs 72 of the sleeve 71 in the pair of notches 60, said shaft will then be set to support the shaft 28 in position having the cams C, D and E of the set 45 disposed, as shown in Figure 1, beneath the contacts 53, 54 and 55. As will be seen, the lugs of these cams will cooperate with said contacts for selecting first the low speed gear, then the second speed gear, and then the third speed gear, when the cycle will be repeated, the gears being shifted from one speed to the other each time the clutch pedal is shifted. When the lugs 72 of the sleeve 71 are engaged in the pairs of notches 61, as shown in Figure 4, the shaft 65 will then be set to support the shaft 28 having its cams disposed in neutral position or in such position that no one of said cams will cooperate with the contacts 53, 54, 55 and 56. Under these conditions, no gear will be selected when the clutch pedal is shifted. By swinging the rear end of the shaft 65 upwardly and engaging the lugs 72 of the sleeve 71 in the pair of notches 62, said shaft will then be set to support the shaft 28 having the cams C, D and E of the set 45 disposed beneath the contacts 54, 55 and 56. Thus, the lugs of these cams will then cooperate with said contacts for selecting first the second speed gear, then the high speed gear, and then the reverse speed gear, when the cycle will be repeated. By swinging the rear end of the shaft 65 to its uppermost position and engaging the lugs 72 of the sleeve 71 in the pair of notches 63, said shaft will then be set to support the shaft 28 having the cams A and B of the set 44 disposed beneath the contacts 54 and 55 respectively. Consequently, first the second speed gear and then the high speed gear will be selected. However, this cycle will not, since each of these cams is provided with only one cam lug, be continuously repeated. Accordingly, after the high speed gear has been selected, the speed gears, when the clutch pedal is next shifted, will be moved to neutral position. As will be perceived, positions for the shaft 28 other than those indicated, may be supplied, so that gear cycles other than those described would be selected. Furthermore, should a change speed gear be capable of four speeds forward, instead of three, as in the present instance, the number of cams in any of the sets could, by properly increasing the number of teeth on the ratchet 30, be increased to meet the condition of the greater number of speeds. All such minor variations are, accordingly, contemplated within the spirit of the present invention.

The sleeve 71 is provided at its upper side with a sight opening 74 and upon the inner end portion of the indicator 69 is a series of circumferentially spaced characters 75 coordinated with the set 46 of cams upon the shaft 28. When the lugs 72 of said sleeve are engaged in the pair of notches 59, these characters will be selectively readable through said sight opening for indicating the coming gear which will be selected by said cams, it being noted that when the clutch pedal 26 is shifted forwardly and the shaft 28 is rotated, the indicator, like the shaft, will be turned sixty degrees for bringing a new character to view at the sight opening. In advance of the series of characters 75 is a second series of circumferentially spaced characters 76 coordinated with the set 45 of the cams for indicating the coming gear which will be selected thereby. In advance of the series 76 of characters, the indicator preferably carries the word Neutral for indicating that the cams of the shaft 28 are disposed in neutral position, as previously described. The indicator carries a third series of characters 77 also coordinated with the set 45 of cams for indicating the coming gear to be selected when these cams are disposed beneath the contacts 54, 55 and 56. Upon the outer end portion of the indicator is a series of characters 78 coordinated with the set 44 of cams. Thus, by glancing at the indicator, the operator will, before shifting the clutch pedal, be apprised of the gear which will be moved to active position and, as will now be clear, the operator may, by properly setting the shaft 65 and manually rotating the indicator, cause any gear desired to be selected when the clutch pedal is moved.

Having thus described the invention, what is claimed as new is:

1. The combination with speed gears, electro-responsive shifting means therefor, circuit connections for said shifting means, and foot operated control means to energize said electro-responsive means, of circuit closing means adapted to be set for selecting one of said circuit connections whereby to select a gear change and operable to close a circuit through said connection intermittently, and an operative connection between said control means and said circuit closing means whereby one will be actuated with the other.

2. The combination with electrically actuated gear shifting mechanism, control means for energizing said mechanism, and foot operated means for actuating the control means, of a cam shaft, a contact in circuit with said mechanism, a cam on the shaft for closing said contact whereby to effect a gear change, and means operable by said foot operated means for rotating the cam shaft.

3. The combination with electrically actuated gear shifting mechanism, control means for energizing said mechanism, and foot operated means for actuating the control means, of a cam shaft, a contact in circuit with said mechanism, a cam on the shaft for closing said contact whereby to effect a gear change, a ratchet on the cam shaft, and a pawl mounted to cooperate with said ratchet and operatively connected with said foot operated means whereby the cam shaft will be rotated.

4. The combination with electrically actuated gear shifting mechanism, of a cam shaft, a plurality of contacts in circuit with said mechanism, cams on the cam shaft for selectively closing said contacts whereby to effect successively the gear changes of a sequence of gear changes, and means for rotating the cam shaft.

5. The combination with electrically actuated gear shifting mechanism, of a cam shaft, contacts in circuit with said mechanism, a cam on the cam shaft, means for setting the shaft whereby said cam will cooperate with said contacts selectively for closing the contacts and selecting a speed gear, and means for rotating the cam shaft.

6. The combination with electrically actuated gear shifting mechanism, of a cam shaft, contacts in circuit with said mechanism, sets of cams on the cam shaft, means for setting said shaft whereby said sets of cams will selectively cooperate with said contacts for closing the contacts and successively selecting the gears of a cycle of gears of said mechanism, and means for rotating the cam shaft.

7. The combination with electrically actuated gear shifting mechanism, of a cam shaft, a contact in circuit with said mechanism, a cam on the cam shaft, a pivoted shaft coupled with the cam shaft and normally driven thereby, the pivoted shaft being adjustable for setting the cam shaft whereby said cam will close said contact for selecting a speed gear, means for locking the pivoted shaft in adjusted position, and means for rotating the cam shaft.

8. The combination with electrically actuated gear shifting mechanism, of a cam shaft, means for rotating said shaft, a contact in circuit with said mechanism, a cam on the cam shaft, a pivoted indicator shaft coupled with the cam shaft and normally driven thereby, the indicator shaft being adjustable for setting the cam shaft whereby said cam will cooperate with said contact for selecting a speed gear, an indicator carried by the indicator shaft, and a spring pressed sleeve carried by the indicator and provided with locking means for securing the indicator shaft in adjusted position.

9. The combination with electrical gear shifting mechanism, of circuit closing means adapted to be set for selecting a gear change and operable for effecting the change, and foot operated means driving the first means.

10. The combination with electrical gear shifting mechanism, of intermittent circuit closing means adapted to be set for selecting a gear change and operable for effecting the change, and foot operated means driving the first means step by step.

11. The combination with electrical gear shifting mechanism, of circuit closing means adapted to be set for selecting a sequence of gear changes and operable for effecting successively the changes of said sequence, and foot operated means driving the first means.

12. The combination with electrical gear shifting mechanism, of intermittent circuit closing means adapted to be set for selecting a sequence of gear changes and operable for effecting successively the changes of said sequence, and foot operated means driving the first means step by step.

13. The combination with electrical gear shifting mechanism, of means operable for effecting successively the gear changes of a sequence of gear changes, and means for setting the first means to select a particular gear of the sequence to be first shifted.

14. The combination with electrical gear shifting mechanism, of means for selecting any one of a given number of sequences of gear changes, and means for actuating the first means to effect successively the gear changes of the sequence selected.

15. The combination with electrical gear shifting mechanism, of means for selecting any one of a given number of sequences of gear changes, the number of changes of the sequences being different, and means for actuating the first means to effect successively the gear changes of the sequence selected.

16. The combination with electrical gear shifting mechanism, of means for selecting any one of a given number of sequences of gear changes, and means for actuating the first means to effect successively the gear changes of the sequence selected and repeating the changes in sequence.

17. The combination with electrical gear shifting mechanism, of means for selecting any one of a given number of sequences of gear changes, and means for actuating the first means to effect successively the gear changes of the sequence selected, the first means being adapted to cause the gears to be moved to neutral at the end of one of said sequences.

18. The combination with electrical gear shifting mechanism, of means adapted to be set for selecting a gear change, and means driven by the first means for visibly indicating the change.

19. The combination with electrical gear shifting mechanism, of means adapted to be set for selecting a sequence of gear changes, and means driven by the first means for visibly indicating the changes in sequence.

20. The combination with electrical gear shifting mechanism, of circuit closing means adapted to be set for selecting a gear change and operable for effecting the change, a combined indicating and setting means for the first means and foot operated means driving the first means.

21. The combination with electrical gear shifting mechanism, of means adapted to be set for selecting a gear change and operable for effecting the change, and foot operated means driving the first means.

22. The combination with electrical gear shifting mechanism, of means adapted to be set for selecting a gear change, and means driven by the first means for visibly indicating the change, the latter means being also manually operable for setting the first means to select said change.

23. The combination with speed gears, electro-responsive shifting means therefor, circuit connections for said shifting means, and foot operated control means to energize said electro-responsive means, of circuit closing means adapted to be set for selecting one of the circuit connections of said electro-responsive means whereby to select a gear change and operable for effecting the change, and means driving said circuit closing means.

In testimony whereof I affix my signature.

CLARENCE W. SHOCKLEY. [L. S.]